(12) United States Patent
Nguyen

(10) Patent No.: US 11,132,879 B2
(45) Date of Patent: Sep. 28, 2021

(54) ENCLOSURES FOR COUPLING TO ASSET WALLS

(71) Applicant: Hewlett Packard Enterprise Development LP, Houston, TX (US)

(72) Inventor: Tri Nguyen, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/689,167

(22) Filed: Nov. 20, 2019

(65) Prior Publication Data

US 2020/0160677 A1    May 21, 2020

Related U.S. Application Data

(63) Continuation of application No. 16/191,682, filed on Nov. 15, 2018, now Pat. No. 10,510,230.

(51) Int. Cl.
*G08B 1/00* (2006.01)
*G08B 13/14* (2006.01)
*H04W 4/029* (2018.01)

(52) U.S. Cl.
CPC ....... *G08B 13/149* (2013.01); *G08B 13/1436* (2013.01); *H04W 4/029* (2018.02)

(58) Field of Classification Search
CPC .................................. G08B 1/00; G06Q 10/00
See application file for complete search history.

(56) References Cited

U.S. PATENT DOCUMENTS

| 6,137,414 A * | 10/2000 | Federman ............... G08B 13/06 340/539.1 |
| 6,469,627 B1 | 10/2002 | Forster et al. |
| 9,530,090 B2 | 12/2016 | Nekoogar et al. |
| 2005/0219046 A1* | 10/2005 | Noguchi ............... G08B 29/046 340/507 |
| 2013/0113627 A1 | 5/2013 | Tiedmann |
| 2014/0266674 A1* | 9/2014 | Nye ..................... G08B 29/046 340/507 |
| 2016/0122097 A1* | 5/2016 | Chudy .................. A61J 7/0076 221/1 |
| 2017/0103683 A1 | 4/2017 | Yazdi et al. |
| 2018/0276964 A1* | 9/2018 | Yang .................. G08B 13/2417 |

OTHER PUBLICATIONS

"RFID Tamper Evident Tracking and Tracing Management," SkyRFID Inc., Retrieved Sep. 25, 2018, 4 Pgs., <http://skyrfid.com/RFID_Tamper_Evident_Management.php>.
SkyRFID Inc., "RFID Asset Tracking—Asset Protection & Asset Tracking Inventory," retrieved online Nov. 29, 2019. https://skyrfid.com/RFID__Asset__Tracking.php.

* cited by examiner

*Primary Examiner* — Shirley Lu
(74) *Attorney, Agent, or Firm* — Hewlett Packard Enterprise Patent Department

(57) ABSTRACT

In some examples, an enclosure can include a lever to interact with an asset wall when the enclosure is coupled to the asset wall, an actuator coupled to a switch to interact with the lever, and an aperture to allow the actuator to move with the lever when the enclosure is removed from the asset wall, wherein the actuator provides a signal to the switch when the actuator moves beyond a threshold angle.

13 Claims, 5 Drawing Sheets

ENCLOSURES FOR COUPLING TO ASSET WALLS

CROSS-REFERENCE TO RELATED APPLICATION

This application is a continuation of co-pending U.S. patent application Ser. No. 16/191,682, filed Nov. 15, 2018, the entire contents of which are hereby incorporated by reference as though fully set forth herein.

BACKGROUND

A computing system topology can include a plurality of computing devices that can utilize applications to perform functions. The computing devices can be hardware devices that can communicate with other computing devices or perform particular functions. The computing devices can utilize instructions stored on memory resources that can be executed by a processing resource. Some computing system topologies can be an internet of things (IoT) computing system that can utilize a plurality of IoT devices that communicate with other devices within the computing system. In some examples, IoT devices can be coupled to asset devices to track the physical location of the asset.

DETAILED DESCRIPTION

Figure 1:
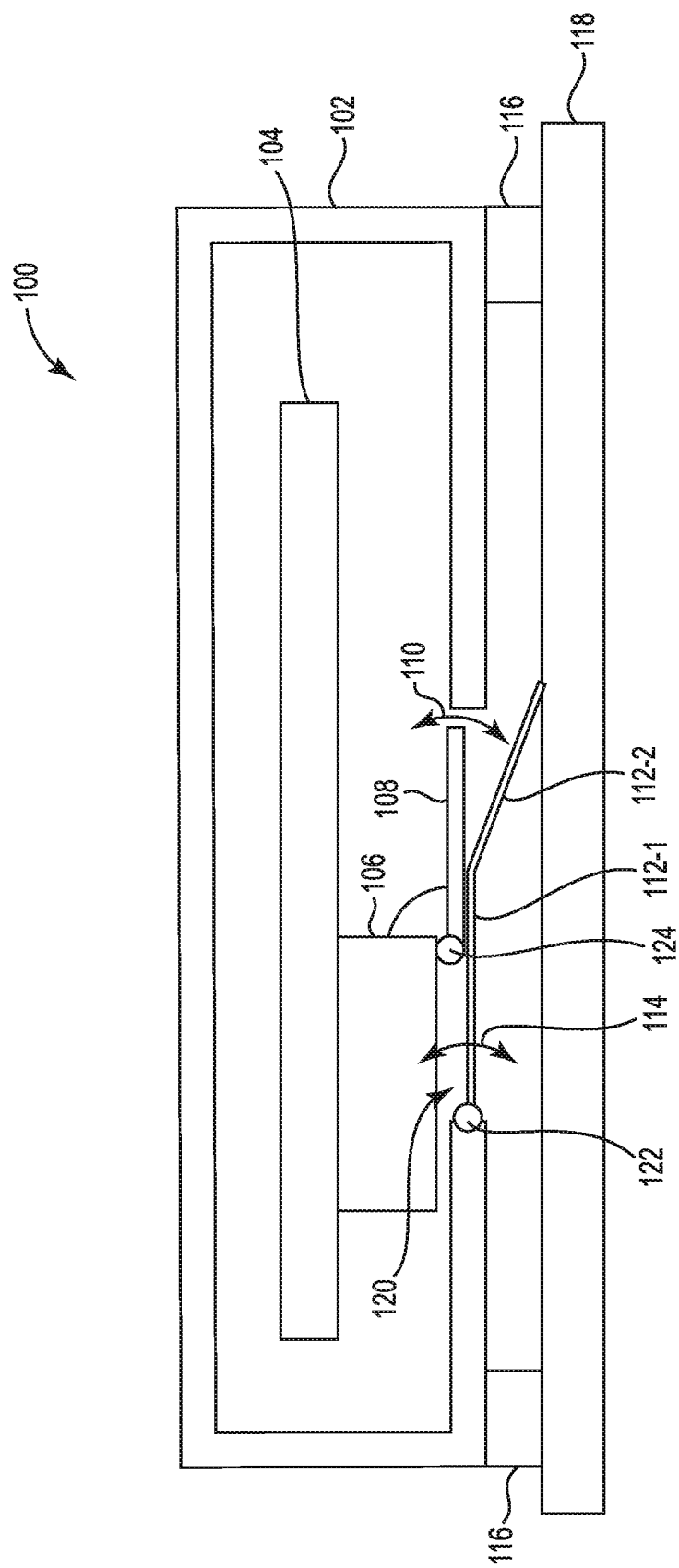
FIG. 1 illustrates an example of a system that includes an enclosure coupled to an asset wall consistent with the disclosure.

A network or computing system can include a plurality of computing devices that be utilized to perform particular functions and/or communicate with other devices. For example, a computing system can include servers, access points, databases, virtual machines, and/or other types of computing devices. In some examples, a network or computing system can be an Internet of things (IoT) network. As used herein, an IoT network can, for example, include network of devices (e.g., access points, routers, computing devices, IoT devices, etc.) with networking capabilities to send and receive data. As used herein, an IoT device can, for example, include a non-traditional network device with networking capabilities to send and receive data with other computing devices and/or other IoT devices.

In some examples, IoT devices can utilize enclosures that can be coupled to other devices to track a physical location of the other devices. For example, an IoT device can be coupled to a wall or surface of an asset. In this example, the asset can be a device or object with a particular value. In this example, the IoT device can be coupled to the wall or surface of the asset to track a physical location of the asset.

In some examples, tracking the physical location of the asset can be utilized to prevent theft or misplacement of the asset.

In previous systems an IoT device included an actuator that would directly interact with the wall of the asset when the IoT device was coupled to the asset. When the IoT device was removed from the asset, the actuator would move and provide an indication that the IoT device was being removed from the wall of the asset. However, in these previous systems, a tool or device could be positioned between the wall of the asset and the actuator to prevent the actuator from moving and providing the indication that the IoT device was being removed from the wall of the asset.

The present disclosure relates to IoT devices that include enclosures that can be coupled to the wall of an asset without allowing a device to positioned between the enclosure of the IoT device and the asset wall. In this way, the present disclosure relates to devices and systems that prevent tampering of IoT devices coupled to a wall of an asset. In some examples, the IoT devices can include a lever to interact with an asset wall when the enclosure is coupled to the asset wall. In these examples, the lever can be positioned between the actuator and the asset wall to help prevent a device from tampering with the actuator of the IoT device. In some examples, the IoT device enclosures described herein, an aperture of the enclosure can include an enclosure ring that surrounds the aperture and can be positioned within a wall ring coupled to the asset wall. In these examples, the enclosure ring and the wall ring can be utilized to prevent devices from interacting with the lever when the IoT device is coupled to the asset wall. In this way, the IoT device may not be removed from the wall of the asset without a notification being provided or an alarm being initiated.

FIG. 1 illustrates an example of a system 100 that includes an enclosure 102 coupled to an asset wall 118 consistent with the disclosure. In some examples, the enclosure 102 can be an enclosure of an IoT device. For example, the enclosure 102 can include a circuit assembly 104 that can include a processing resource and/or a memory resource for providing a function (e.g., determining a geographic location, generating an alarm, generating a notification, receiving a signal, sending a signal, etc.). In some examples, the circuit assembly 104 can include instructions to monitor a feature of the asset 118. In some examples, the feature of the asset is a geographic location of the asset 118. In some examples, the IoT device can send an alarm or other type of notification when it is determined that the IoT device has been removed from the asset wall 118.

In some examples, the enclosure 102 can be coupled to the asset wall 118 with an attachment mechanism 116. In some examples, the asset wall 118 is a surface of a device to be monitored by the IoT device with the enclosure 102. In some examples, the attachment mechanism 116 can be a permanent or semi-permanent bonding material that can physically couple the enclosure 102 to the asset wall 118. In some examples, the attachment mechanism 116 can include double sided tape that the can create a first bond between the tape and the enclosure 102 and create a second bond between the tape and the asset wall 118. In some examples, the enclosure 102 can be coupled to the asset wall 118 with an attachment mechanism 116 at or between an edge of the enclosure 102 and a wall ring coupled to the asset wall 118. For example, the attachment mechanism 116 can be positioned on an edge of the enclosure 102 such that the attachment mechanism 116 is positioned between the edge of the enclosure 102 and the wall ring or enclosure ring.

In some examples, such as the double sided tape example, the attachment mechanism 116 can be penetrated by a device (e.g., relatively thin piece of metal, etc.) such that the device can be positioned between the asset wall 118 and the enclosure 102. These types of devices can be utilized to prevent the actuator 108 from triggering a switch 106 that can generate an alarm or notification that the enclosure 102 has been removed from the asset wall 118. For example, the switch 106 can be communicatively coupled to the circuit assembly 104 to provide a notification to the circuit assembly 104 when the actuator 108 moves beyond a threshold angle. This type of tampering can be prevented utilizing a lever 112-1, 112-2 as described further herein. In some examples, a wall ring can be coupled to the asset wall 118 and an enclosure ring can be coupled to the enclosure 102 prevent access to the aperture through the attachment mechanism 116.

In some examples, the system 100 can include a switch 106 that is coupled to the circuit assembly 104 within the enclosure 102. In some examples, the switch 106 can be coupled to an actuator 108 by a hinge 124. In some examples, the hinge 124 can allow the actuator 108 to move in the direction of the double sided arrow 110. In some examples, the switch 106 can be in a first state when the actuator 108 is in a first location and the switch 106 be in a second state when the actuator 108 is in a second location. In some examples, the switch 106 can switch between a first state and a second state based on an angle of the actuator 108.

For example, when the actuator 108 is in a first location or position, the actuator 108 can provide an angle between a surface of the actuator 108 and a side of the switch 106 that is approximately 90 degrees. In this example, the switch 106 can be in a first state when the actuator is approximately 90 degrees or less. In this example, the switch 106 can increase the angle when the enclosure 102 is removed from the asset wall 118 when the actuator 108 moves through an aperture 120 of the enclosure 102. In this example, the switch 106 can be in a second state when the angle of the actuator 108 is greater than 90 degrees, which can indicate that the enclosure 102 has been removed from the asset wall 118. That is, the aperture 120 can allow the actuator 108 to move with the lever 112-1, 112-2 when the enclosure 102 is removed from the asset wall 218. In some examples the actuator 108 can provide a signal to the switch 106 when the actuator 108 moves beyond a threshold angle (e.g., greater than 90 degrees, etc.).

In some examples, a first state of the switch 106 can indicate that the enclosure 102 is coupled to the asset wall 118 and the second state of the switch 106 can indicate that the enclosure 102 has been removed from the asset wall 118. In this way, the switch 106 can be utilized to provide a signal to the circuit assembly 104 when the enclosure 102 is removed from the asset wall 118 by providing a signal to the circuit assembly 104 when the actuator 108 moves through the aperture 120.

In some examples, the system 100 can include a lever 112-1, 112-2 that includes a first portion 112-1 and a second portion 112-2. In some examples, the first portion 112-1 can be coupled to the enclosure 102 through a hinge 122 to allow the lever 112-1, 112-2 to move in the direction of double-sided arrow 114. In some examples, the lever 112-1, 112-2 can be utilized to interact with the actuator 108 and the asset wall 118. For example, the second portion 112-2 can be in physical contact with the asset wall 118 and the first portion 112-1 can be in physical contact with the actuator 108 to maintain a position of the actuator 108 so long as the second portion 112-2 is in physical contact with the asset wall 118.

In some examples, the first portion 112-1 can be coupled to a first side or edge of the aperture 120 by a hinge 122. In some examples, the first portion 112-1 can extend from an edge of the aperture 120 substantially parallel to the enclosure 120 portion adjacent to the aperture 120 to cover a portion of the aperture 120 when the second portion 112-2 interacts with the asset wall 118. That is, the first portion 112-1 can extend from a first edge of the aperture 120 toward a second edge of the aperture 120 to prevent the actuator 108 from moving through the aperture 120 when the second portion 112-2 interacts with the asset wall 118. In this way, the first portion 112-1 prevents the actuator 108 from altering a state of the switch 106 while the enclosure 102 is coupled to the asset wall 118.

In some examples, the second portion 112-2 can be angled away from the enclosure 102 toward a location of the asset wall 118. In this way, an angle can be created between the first portion 112-1 and the second portion 112-2. In some examples, the second portion 112-2 can be angled away from the enclosure 102 and extend beyond a perimeter of the aperture 120. For example, the first portion 112-1 can be coupled to a first edge of the perimeter of the aperture 120 and the second portion 112-2 can extend beyond a second edge of the perimeter of the aperture 120. In this way, the lever 112-1, 112-2 can prevent devices from being positioned within the aperture 120, which can prevent the actuator 108 from altering in position and altering the state of the switch 106.

In some examples, the lever 112-1, 112-2 can make it more difficult to position a device between the lever 112-1, 112-2 and the asset wall 118, which can make tampering with the enclosure 102 or removing the enclosure 102 from the asset wall 118 without altering the position of the actuator 108 more difficult. As described herein, the angle between the first portion 112-1 and the second portion 112-2 can allow the first portion 112-1 to be coupled to a first edge of the perimeter of the aperture 120 and allow the second portion 112-2 to extend beyond a second edge of the perimeter of the aperture 120 to prevent the devices from interacting with the actuator 108.

Figure 2:
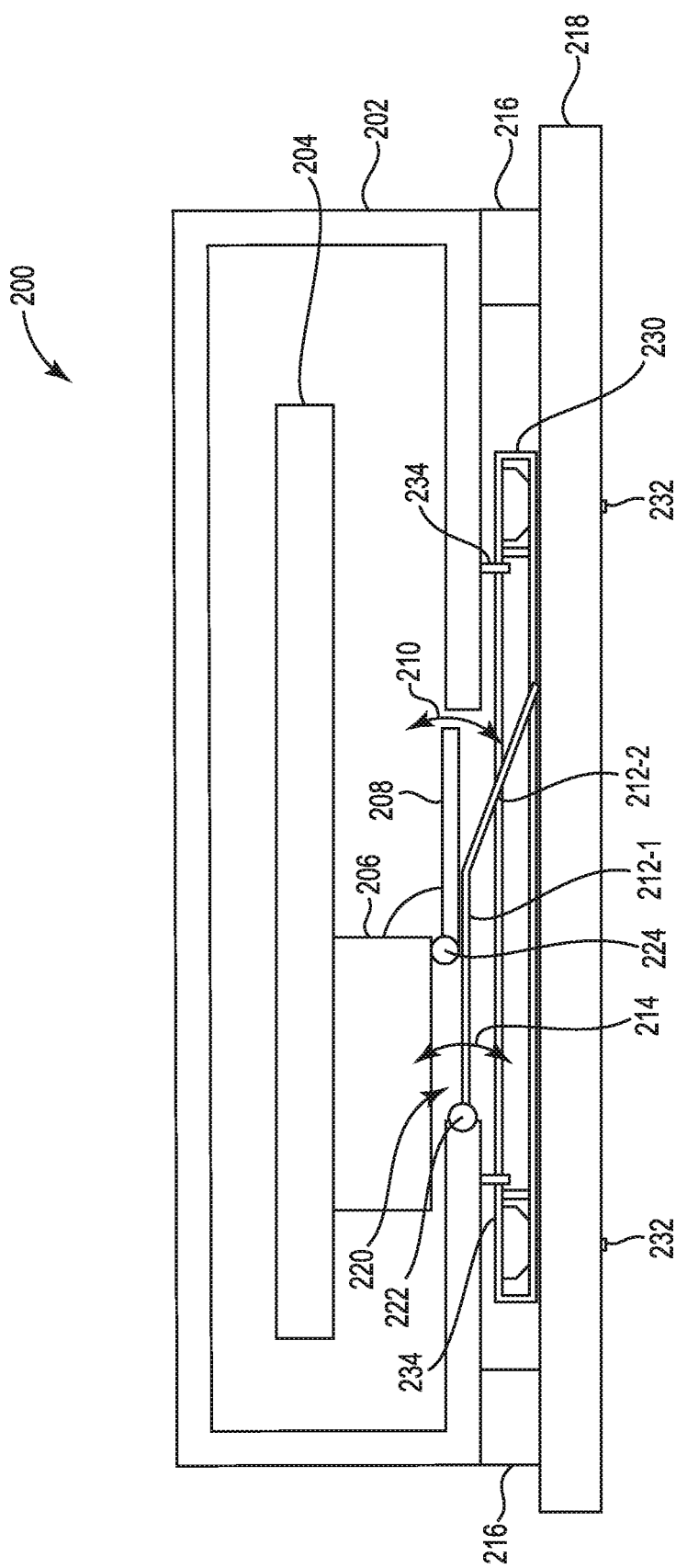
FIG. 2 illustrates an example of a system that includes an enclosure coupled to an asset wall consistent with the disclosure.

FIG. 2 illustrates an example of a system 200 that includes an enclosure 202 coupled to an asset wall 218 consistent with the disclosure. In some examples, the enclosure 202 can be an enclosure of an IoT device similar to enclosure 102 as referenced in FIG. 1. For example, the enclosure 202 can include a circuit assembly 204 that can include a processing resource and/or a memory resource for providing a function (e.g., determining a geographic location, generating an alarm, generating a notification, receiving a signal, sending a signal, etc.).

In some examples, the enclosure 202 can be coupled to the asset wall 218 with an attachment mechanism 216. As described herein, the attachment mechanism 216 can be a permanent or semi-permanent bonding material that can physically couple the enclosure 202 to the asset wall 218. As described herein, the attachment mechanism 216 can be penetrated by a device (e.g., relatively thin piece of metal, etc.) such that the device can be positioned between the asset wall 218 and the enclosure 202. These types of devices can be utilized to prevent the actuator 208 from triggering a switch 206 that can generate an alarm or notification that the enclosure 202 has been removed from the asset wall 218. This type of tampering can be prevented utilizing a lever 212-1, 212-2, an enclosure ring 234, and/or a wall ring 230 as described further herein.

In some examples, the system 200 can include a switch 206 that is coupled to the circuit assembly 204 within the enclosure 202. In some examples, the switch 206 can be coupled to an actuator 208 by a hinge 224. In some examples, the hinge 224 can allow the actuator 208 to move in the direction of the double sided arrow 210. In some examples, the switch 206 can be in a first state when the actuator 208 is in a first location and the switch 206 be in a second state when the actuator 208 is in a second location.

In some examples, the switch 206 can switch between a first state and a second state based on an angle of the actuator 208. For example, the switch 206 can be in a first state that indicates the enclosure 202 is coupled to an asset wall 218 when the actuator 208 is at or below an angle threshold and the switch 206 can be in a second state that indicates the enclosure 202 is not coupled to the asset wall 218 when the actuator 208 is above the angle threshold. In some examples, the actuator 208 can be above the angle threshold when the actuator 208 extends through the aperture 220. In this way, the switch 206 can be utilized to provide a signal to the circuit assembly 204 when the enclosure 202 is removed from the asset wall 218 by providing a signal to the circuit assembly 204 when the actuator 208 moves through the aperture 220.

In some examples, the system 200 can include a lever 212-1, 212-2 that includes a first portion 212-1 and a second portion 212-2. In some examples, the first portion 212-1 can be coupled to the enclosure 202 through a hinge 212 to allow the lever 212-1, 212-2 to move in the direction of double sided arrow 214. In some examples, the lever 212-1, 212-2 can be utilized to interact with the actuator 208 and the asset wall 218 when the enclosure 202 is coupled to the asset wall 218. For example, the second portion 212-2 can be in physical contact with the asset wall 218 and the first portion 212-1 can be in physical contact with the actuator 208 to maintain a position of the actuator 208 so long as the second portion 212-2 is in physical contact with the asset wall 218.

As described herein, the first portion 212-1 can be coupled to a first side or edge of the aperture 220 by a hinge 222. In some examples, the first portion 212-1 can extend from an edge of the aperture 220 substantially parallel to the enclosure 220 portion adjacent to the aperture 220 to cover a portion of the aperture 220 when the second portion 212-2 interacts with the asset wall 218. That is, the first portion 212-1 can extend from a first edge of the aperture 220 toward a second edge of the aperture 220 to prevent the actuator 208 from moving through the aperture 220 when the second portion 212-2 interacts with the asset wall 218. In this way, the first portion 212-1 prevents the actuator 208 from altering a state of the switch 206 while the enclosure 202 is coupled to the asset wall 218.

As described herein, the second portion 212-2 can be angled away from the enclosure 202 toward a location of the asset wall 218. In this way, an angle can be created between the first portion 212-1 and the second portion 212-2. In some examples, the second portion 212-2 can be angled away from the enclosure 202 and extend beyond a perimeter of the aperture 220. For example, the first portion 212-1 can be coupled to a first edge of the perimeter of the aperture 220 and the second portion 212-2 can extend beyond a second edge of the perimeter of the aperture 220. In this way, the lever 212-1, 212-2 can prevent devices from being positioned within the aperture 220, which can prevent the actuator 208 from altering in position and altering the state of the switch 206.

In some examples, the system 200 can include an enclosure ring 234 that can be positioned around a perimeter of the aperture 220. For example, the enclosure ring 234 can be molded into the enclosure 202 to extend outward from the enclosure 202 on a bonding surface of the enclosure 202. As used herein, a bonding surface of the enclosure can include a surface to be coupled to an asset wall 218. In some examples, the enclosure ring 234 can be positioned on the exterior of the enclosure 202 around a perimeter of the aperture 220. In some examples, the enclosure ring 234 can be utilized to prevent a device from puncturing the attachment mechanism 216 and interacting with the lever 212-1, 212-2 between the enclosure 202 and the asset wall.

In some examples, the enclosure ring 234 can interact with a wall ring 230 to further prevent a device from puncturing the attachment mechanism 216 and interacting with the lever 212-1, 212-2 between the enclosure 202 and the asset wall 218. In some examples, the enclosure ring 234 can be separate from the enclosure 202 and/or the asset wall 218. That is, the wall ring 230 can be made of a first material and the enclosure 202 can be made a second material that is different than the first material. In some examples, the wall ring 230 can be coupled to the asset wall 218 with an attachment mechanism 232. In some examples, the attachment mechanism 232 can be a permanent or semi-permanent mechanism that can attach the wall ring 230 to the asset wall 218. In some examples, the attachment mechanism 232 can include screws or a mechanical attachment mechanism to prevent the wall ring 230 from moving along the surface of the asset wall 218. For example, the attachment mechanism 232 can be utilized to prevent the wall ring 230 from moving in a parallel direction to the asset wall 218.

In some examples, the wall ring 230 can include aperture to receive the enclosure ring 234. For example, the enclosure ring 234 can surround a perimeter of the aperture 220 and the enclosure ring 234 can be positioned within the aperture of the wall ring 230. In some examples, the wall ring 230 can protrude from the surface of the asset wall 218 to surround the enclosure ring 234.

Figure 3:
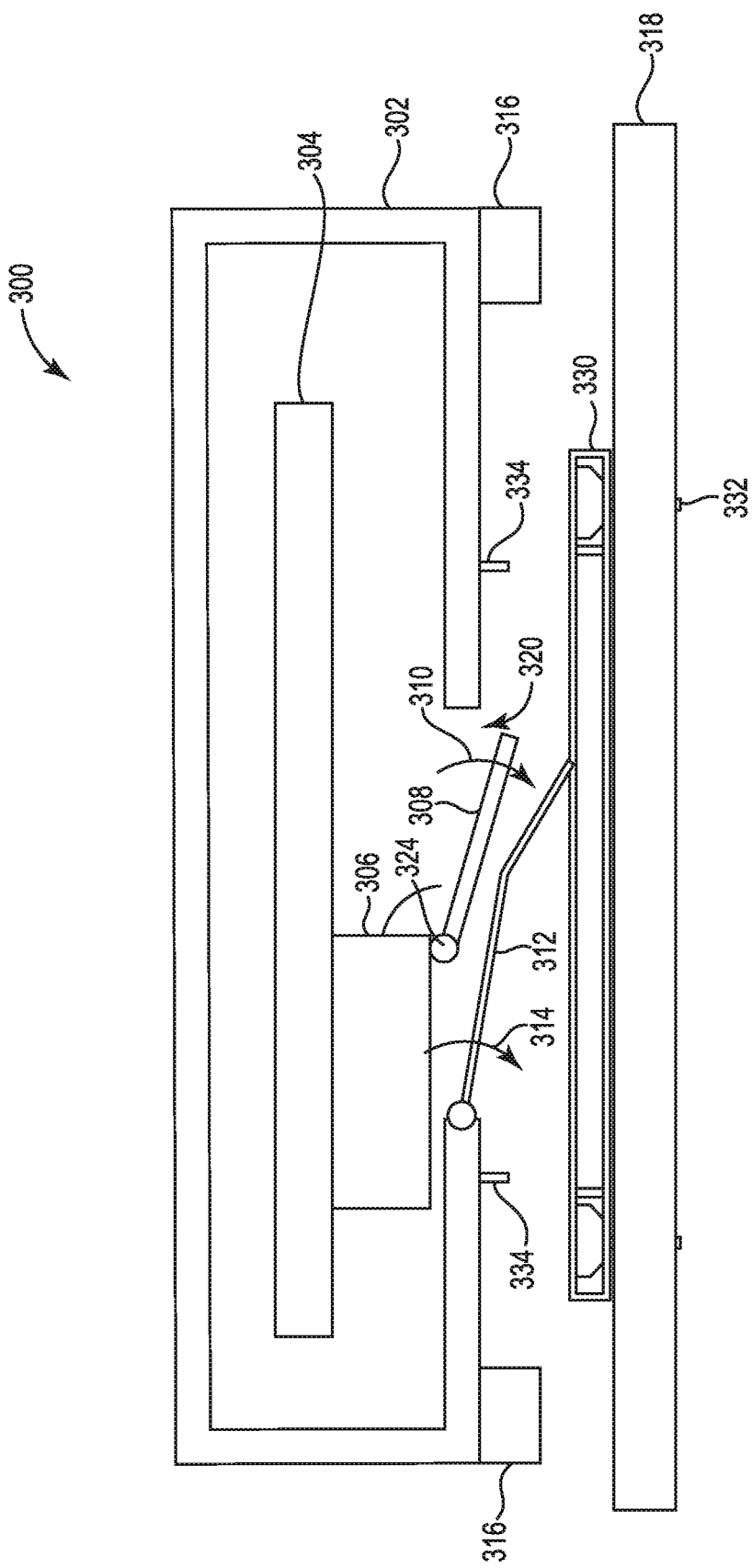
FIG. 3 illustrates an example of a system that includes an enclosure removed from an asset wall consistent with the disclosure.

In this way, the enclosure ring 234 can protrude from a bonding surface of the enclosure 202 and the wall ring 230 can protrude from a surface of the asset wall 218 to surround the enclosure ring 234. Thus, the enclosure ring 234 and the wall ring 230 can prevent access to the aperture 220, lever 212-1, 212-2, and/or actuator 208 to provide greater security against tampering with the system 200. In some examples, the lever 212-1, 212-2 can be positioned within a perimeter of the enclosure ring 234 and the wall ring 230 to make it more difficult to position a device between the lever 212-1, 212-2 and the asset wall 218, which can make tampering with the enclosure 202 or removing the enclosure 202 from the asset wall 218 without altering the position of the actuator 208 more difficult, FIG. 3 illustrates an example of a system 300 that includes an enclosure 302 removed from an asset wall 318 consistent with the disclosure. In some examples, the enclosure 302 can be an enclosure of an IoT device similar to enclosure 102 as referenced in FIG. 1 and/or enclosure 202 as referenced in FIG. 2. For example, the enclosure 302 can include a circuit assembly 304 that can include a processing resource and/or a memory resource for providing a function (e.g., determining a geographic location, generating an alarm, generating a notification, receiving a signal, sending a signal, etc.).

In some examples, the system 300 can include a switch 306 that is coupled to the circuit assembly 304 within the enclosure 302. In some examples, the switch 306 can be coupled to an actuator 308 by a hinge 324. In some examples, the hinge 324 can allow the actuator 308 to move in the direction of the arrow 310 when the enclosure 302 is moved away from the asset wall 318 (e.g., upward direction as illustrated in FIG. 3). In some examples, the switch 306 can be in a first state when the actuator 308 is in a first location (e.g., within the enclosure 302, etc.) and the switch 306 be in a second state when the actuator 308 is in a second location (e.g., outside the enclosure 302 through the aperture 320, etc.).

In some examples, the switch 306 can switch between a first state and a second state based on an angle of the actuator 308. For example, the switch 306 can be in a first state that indicates the enclosure 302 is coupled to an asset wall 318 when the actuator 308 is at or below an angle threshold and the switch 306 can be in a second state that indicates the enclosure 302 is not coupled to the asset wall 318 when the actuator 308 is above the angle threshold. As illustrated in FIG. 3, the enclosure 302 has been removed from the asset wall 318 and the actuator 308 has been positioned through the aperture 320, which can exceed the angle threshold and alter the switch from the first state to the second state indicating that the enclosure 302 has been removed from the asset wall 318. That is, the actuator 308 can be above the angle threshold when the actuator 308 extends through the aperture 320. In this way, the switch 306 can be utilized to provide a signal to the circuit assembly 304 when the enclosure 302 is removed from the asset wall 318 by providing a signal to the circuit assembly 304 when the actuator 308 moves through the aperture 320.

In some examples, the system 300 can include a lever 312 to interact with the actuator 308. In some examples, the lever 312 can be utilized to interact with the actuator 308 and the asset wall 318 when the enclosure 302 is coupled to the asset wall 318 and allow the actuator 308 to pass through the aperture 320 when the enclosure 302 is not coupled to the asset wall 318.

In some examples, the system 300 can include an enclosure ring 334 that can be positioned around a perimeter of the aperture 320. For example, the enclosure ring 334 can be molded into the enclosure 302 to extend outward from the enclosure 302 on a bonding surface of the enclosure 302. In some examples, the enclosure ring 334 can be positioned on the exterior of the enclosure 302 around a perimeter of the aperture 320. In some examples, the enclosure ring 334 can interact with a wall ring 330 coupled to the asset wall 318.

As illustrated in FIG. 3, the enclosure 302 has been removed from the asset wall 318 by breaking the coupling of the attachment mechanism 316. As described herein, the attachment mechanism 316 can be a semi-permanent or permanent bonding material that can couple a bonding surface of the enclosure 302 to the asset wall 318. When the attachment mechanism 316 is removed from the asset wall 318 and/or the enclosure 302, the enclosure 302 can be removed from the asset wall 318. In some examples, the enclosure 302 can be moved away from the surface of the asset wall 318 in an upward direction as illustrated in FIG. 3.

In some examples, when the enclosure 302 is moved away from the asset wall 318, the lever 312 can move in an opposite direction (e.g., downward as illustrated in FIG. 3) and allow the actuator 308 to move in the same direction. As described herein, the actuator 308 can exceed a threshold angle when it moves through the aperture 320 and the actuator 308 can alter a state of the switch 306. In some examples, the altered state of the switch 306 can be determined by the circuit assembly 304 and the circuit assembly 304 can generate an alarm or notification that the enclosure 302 has been removed from the asset wall 318.

Figure 4:
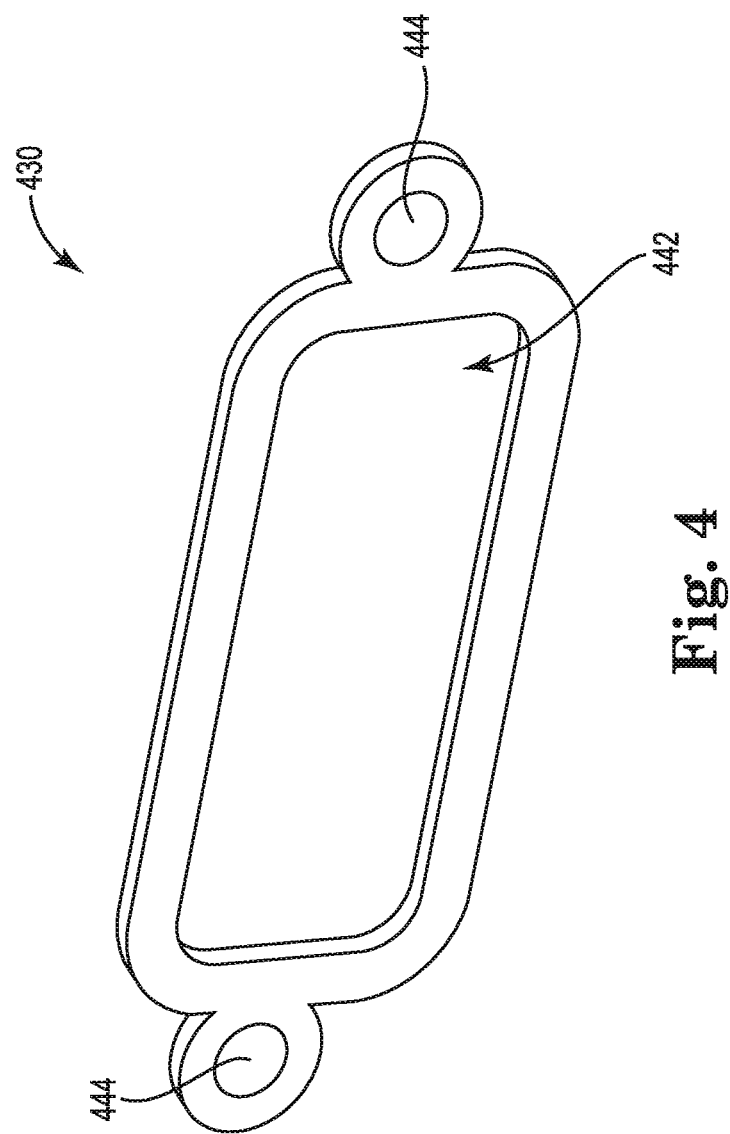
FIG. 4 illustrates an example of a wall ring consistent with the disclosure.

FIG. 4 illustrates an example of a wall ring 430 consistent with the disclosure. In some examples, the wall ring 430 can be the same or similar device as wall ring 230 as referenced in FIG. 2 and/or wall ring 330 as referenced in FIG. 3. In some examples, the wall ring 430 can be a device to help prevent tampering with a lever or actuator of an enclosure of an IoT device. For example, the wall ring 430 can protrude from an asset wall and receive an enclosure ring that protrudes from the enclosure to block a path around an aperture of the enclosure.

In some examples, the wall ring 430 can include an attachment aperture 444. In some examples, the attachment aperture 444 can be utilized to couple the wall ring 430 to a surface of an asset or asset wall. In some examples, the attachment aperture 444 can be apertures to receive screws or bolts that can pass through the attachment aperture 444 and be mechanically coupled to the asset wall. In some examples, different attachment mechanism can be positioned through the attachment aperture 444 to secure the wall ring 430 to the asset wall.

In some examples, the wall ring 430 can include a ring aperture 442 to receive an enclosure ring (e.g., enclosure ring 234 as referenced in FIG. 2, enclosure ring 334 as referenced in FIG. 3, etc.). In some examples, the perimeter of the ring aperture 442 can surround the enclosure ring to ensure a device can not bypass the wall ring 430 and enclosure ring when the enclosure is coupled to the asset wall. In some examples, the ring aperture 442 can include an interior area that includes a similar shape to the exterior arear of the enclosure ring such that an exterior portion of the enclosure ring can be in contact with an interior portion of the ring aperture 442. In this way, the wall ring 430 can prevent movement of the IoT device in a parallel direction to the asset wall and/or wall ring 430.

In some examples, the wall ring 430 can include a thickness or depth that can protrude from the surface of the asset when the wall ring 430 is coupled to the asset wall. In some examples, the thickness or depth of the wall ring 430 can be based on a thickness or depth of the enclosure ring. For example, the thickness or depth of the wall ring can allow the thickness or depth of the enclosure ring to be positioned within the ring aperture 442 such that the enclosure is able to be coupled to the asset wall. For example, the thickness of the wall ring 430 can allow the enclosure ring to be inserted within the ring aperture 442 and allow a bonding surface of the enclosure to be relatively parallel with the asset wall to allow for an attachment mechanism (e.g., attachment mechanism 116 as referenced in FIG. 1, etc.) to couple the enclosure to the asset wall.

Figure 5:
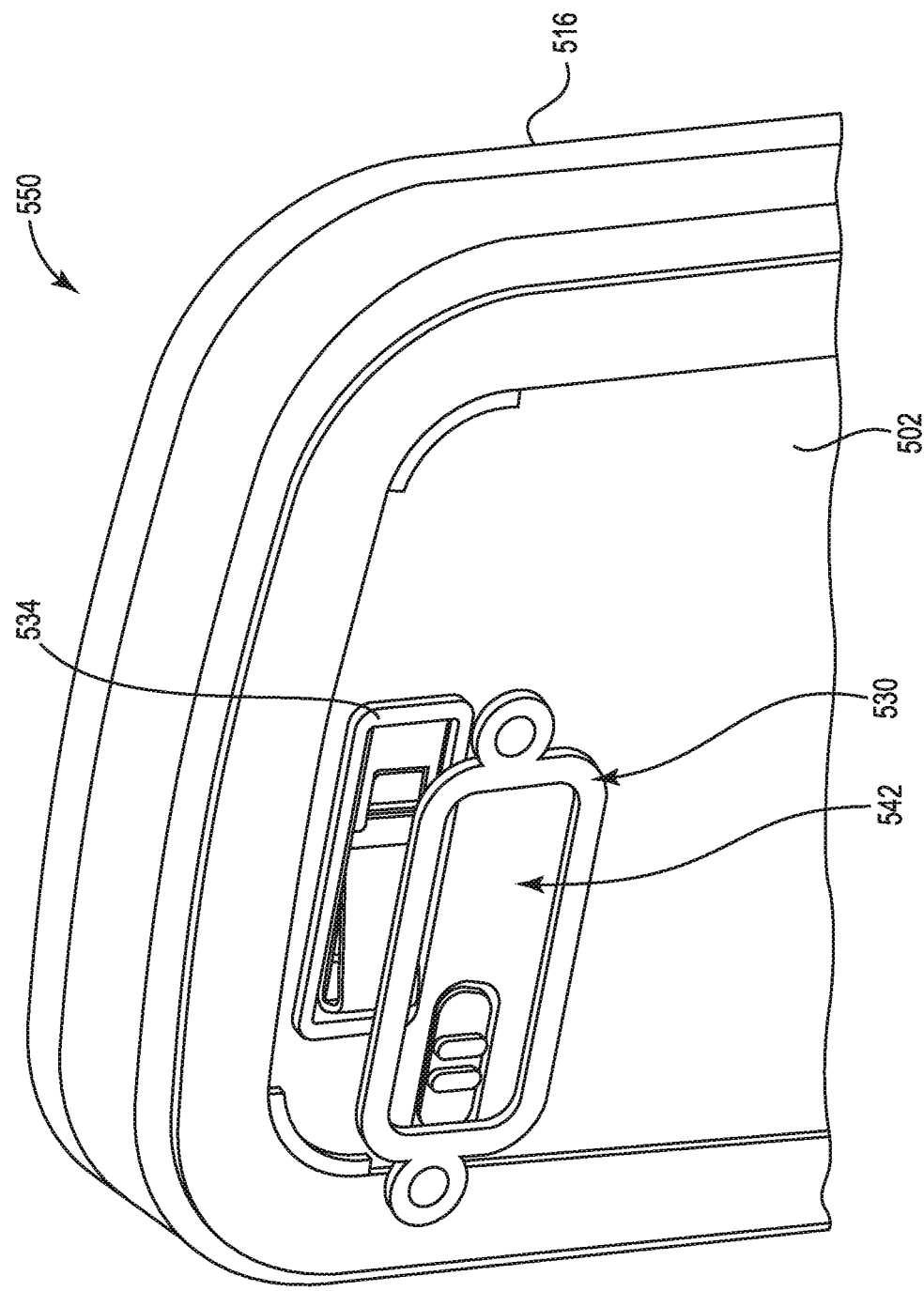
FIG. 5 illustrates an example of a system with an internet of things (IoT) device and a wall ring consistent with the disclosure.

FIG. 5 illustrates an example of a system 550 with an Internet of things (IoT) device and a wall ring 530 consistent with the disclosure. In some examples, the IoT device can include an enclosure 502 that surrounds a computing device to be utilized as an IoT device. For example, the enclosure 502 can be utilized to protect a circuit assembly that can include a processing resource and/or a memory resource to perform particular functions. In some examples the circuit assembly can include networking capabilities for sending and/or receiving wired and/or wireless communication packets.

In some examples, the system 550 can include a lever 512 positioned within a perimeter of an aperture of the enclosure 502. The aperture of enclosure 502 can be the same or similar as aperture 120 as referenced in FIG. 1, aperture 220 as referenced in FIG. 2, and/or aperture 320 as referenced in FIG. 3. In some examples, the lever 512 can be utilized to interact with an asset wall and an actuator of the IoT device as described herein.

In some examples, the enclosure 502 can include an enclosure ring 534 that can protrude from a bonding surface of the enclosure 502. As described herein, the bonding surface of the enclosure 502 can be a surface of the enclosure to be coupled to the asset wall. In some examples, the bonding surface can include an attachment mechanism 516. In some examples, the attachment mechanism 516 can extend around a perimeter of the bonding surface of the enclosure 502. In some examples, the attachment mechanism 516 can be an adhesive material that can bond the enclosure 502 to the asset wall. In some examples, the wall ring 530 can be coupled to the asset wall with a first attachment mechanism (e.g., screws, etc.) and the IoT device or enclosure 502 of the IoT device can be coupled to the asset wall with a second attachment mechanism (e.g., adhesive, etc.).

In some examples, the enclosure ring 534 can protrude a particular distance from the bonding surface of the enclosure 502. In some examples, the particular distance can be based on a thickness or distance the wall ring 530 protrudes from the asset wall when the wall ring 530 is coupled to the asset wall. For example, the enclosure ring 534 can be positioned within a ring aperture 542 of the wall ring 530 such that the attachment mechanism 516 is able to make contact with the asset wall while the enclosure ring 534 is positioned within the ring aperture 542.

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

The figures herein follow a numbering convention in which the first digit corresponds to the drawing figure number and the remaining digits identify an element or component in the drawing. Similar elements or components between different figures can be identified by the use of similar digits. For example, 102 can reference element "02" in FIG. 1, and a similar element can be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

What is claimed:

1. An enclosure, comprising:
   a lever coupled to the enclosure by a hinge and in physical contact with an asset wall when the enclosure is coupled to the asset wall;
   an actuator coupled to a switch to interact with the lever; and
   an aperture to allow the actuator to move with the lever when the enclosure is removed from the asset wall, wherein the actuator provides a signal to the switch when the actuator moves beyond a threshold angle.

2. The enclosure of claim 1, comprising an enclosure ring coupled to the enclosure to surround the aperture.

3. The enclosure of claim 2, comprising a wall ring coupled to the asset wall to surround the enclosure ring.

4. The enclosure of claim 1, comprising a circuit assembly coupled to an interior of the enclosure, wherein the circuit assembly is coupled to the actuator and receives the signal from the switch when the actuator moves beyond the threshold angle.

5. The enclosure of claim 1, wherein the enclosure is coupled to the asset wall with an attachment mechanism at or between an edge of the enclosure and a wall ring coupled to the asset wall.

6. The enclosure of claim 5, wherein the wall ring coupled to the asset wall and an enclosure ring coupled to the enclosure prevent access to the aperture through the attachment mechanism.

7. An Internet of Things (IoT) device comprising:
   an enclosure to surround a portion of a circuit assembly, wherein the enclosure includes an aperture on a side of the enclosure;
   an actuator coupled by a switch to the circuit assembly to provide a signal to the circuit assembly when the actuator extends through a portion of the aperture;
   a lever coupled to the enclosure and in physical contact with an asset wall when the enclosure is coupled top the asset wall, the lever for preventing the actuator from extending through the portion of the aperture when the lever interacts with an asset wall; and
   an enclosure ring coupled to the enclosure to interact with a wall ring coupled to the asset wall to prevent a device from interacting with the lever when the IoT device is coupled to the asset wall
   wherein the actuator provides a signal to the switch when the actuator moves beyond a threshold angle.

8. The IoT device of claim 7, wherein the asset wall is a surface of a device to be monitored by the IoT device.

9. The IoT device of claim 7, wherein the enclosure ring surrounds an edge of the aperture and the wall ring surrounds an edge of the enclosure ring when the IoT device is coupled to the asset wall.

10. The IoT device of claim 7, wherein the lever is coupled to an edge of the aperture by a hinge to allow the lever to move when the IoT device is removed from the asset wall.

11. The IoT device of claim 7, wherein the switch is communicatively coupled to the circuit assembly to provide a notification when the actuator moves beyond a threshold angle.

12. The IoT device of claim 11, wherein the notification indicates that the IoT device has been removed from the asset wall.

13. The IoT device of claim 7, wherein the wall ring is coupled to the asset wall with a first attachment mechanism and the IoT device is coupled to the asset wall with a second attachment mechanism.

* * * * *